United States Patent
Manes et al.

(10) Patent No.: US 8,936,693 B2
(45) Date of Patent: Jan. 20, 2015

(54) METHODS OF AND APPARATUS FOR MAKING A FLEXIBLE COMPOSITE HAVING RESERVOIRS AND CAPILLARIES

(75) Inventors: Kevin Stone Manes, St. Charles, MO (US); John Robinson, Rochdale (GB)

(73) Assignee: Mark Andy, Inc., Chesterfield, MS (US)

( * ) Notice: Subject to any disclaimer, the term of this patent is extended or adjusted under 35 U.S.C. 154(b) by 76 days.

(21) Appl. No.: 13/479,494

(22) Filed: May 24, 2012

(65) Prior Publication Data

US 2012/0298294 A1 Nov. 29, 2012

Related U.S. Application Data

(60) Provisional application No. 61/489,466, filed on May 24, 2011.

(51) Int. Cl.
*B32B 37/02* (2006.01)
*B32B 38/04* (2006.01)
(Continued)

(52) U.S. Cl.
CPC ............ *B01L 3/502707* (2013.01); *G01K 3/04* (2013.01); *G04F 1/00* (2013.01); *B01F 15/0209* (2013.01); *B01L 3/505* (2013.01); *B01L 2200/027* (2013.01); *B01L 2200/0689* (2013.01); *B01L 2300/021* (2013.01); *B01L 2300/044* (2013.01); *B01L 2300/0867* (2013.01);
(Continued)

(58) Field of Classification Search
CPC .... B32B 37/02; B32B 37/1018; B32B 38/04; G06F 1/00

USPC ......... 156/248, 249, 257, 267, 268, 270, 199, 156/209, 219, 245, 285, 290, 292, 293, 314, 156/229; 368/89, 327; 422/57, 61; 436/166, 436/169; 116/206
See application file for complete search history.

(56) References Cited

U.S. PATENT DOCUMENTS 2,052,072 A * 8/1936 Baumwell ....................... 602/47
3,740,797 A 6/1973 Farrington ................... 19/156.3
(Continued)

OTHER PUBLICATIONS

International Preliminary Report on Patentability for PCT/US2012/039289 dated Nov. 26, 2013.
International Search Report and Written Opinion for corresponding PCT Application No. PCT/US2012/39289 Date: Nov. 2, 2012 pp. 13.

*Primary Examiner* — Linda L Gray
(74) *Attorney, Agent, or Firm* — Harness, Dickey & Pierce, P.L.C.

(57) ABSTRACT

A method of manufacturing a flexible composite panel having a plurality of reservoirs connected by at least one capillary includes forming a capillary assembly by winding a flexible, deformable capillary base web partially around a rotating cylinder that has a plurality of recessed features formed therein; drawing the capillary base web into the recessed features to form the capillaries in the capillary base web; filling the capillaries; and laminating a capillary barrier web over the capillary base web. A flexible reservoir assembly is formed by cutting the perimeter of the at least two reservoirs and associated catchments into a flexible reservoir web; removing the waste cut interiors of the reservoirs and the catchments from the reservoir web; securing the reservoir web to a base layer; overfilling each reservoir; and laminating the capillary assembly over the reservoir assembly, driving excess filler from the reservoirs into the catchments.

20 Claims, 10 Drawing Sheets

(51) Int. Cl.
*G04F 1/00* (2006.01)
*B01L 3/00* (2006.01)
*G01K 3/04* (2006.01)
*B01F 15/02* (2006.01)

(52) U.S. Cl.
CPC .... *B01L 2300/0887* (2013.01); *B01L 2300/123* (2013.01); *B01L 2400/0406* (2013.01); *B01L 2400/0677* (2013.01)
USPC .......... 156/257; 156/248; 156/249; 156/267; 156/268; 156/270; 156/293

(56) References Cited

U.S. PATENT DOCUMENTS

| | | |
|---|---|---|
| 5,810,961 A | 9/1998 | Andersen et al. ............ 156/324 |
| 5,830,548 A | 11/1998 | Andersen et al. ............ 428/36.4 |
| 6,401,615 B1 | 6/2002 | Heinicke .................... 101/389.1 |
| 6,649,011 B1 * | 11/2003 | Hardt et al. ................... 156/267 |
| 2005/0008537 A1 | 1/2005 | Mosoiu et al. ................. 422/56 |
| 2008/0210152 A1 | 9/2008 | Robinson et al. ............ 116/206 |
| 2009/0266478 A1 * | 10/2009 | Schafer et al. ............... 156/229 |
| 2010/0322037 A1 | 12/2010 | Robinson et al. ............ 368/89 |

* cited by examiner

METHODS OF AND APPARATUS FOR MAKING A FLEXIBLE COMPOSITE HAVING RESERVOIRS AND CAPILLARIES

CROSS-REFERENCE TO RELATED APPLICATIONS

This application claims the benefit of U.S. Provisional Application No. 61/489,466, filed on May 24, 2011. The entire disclosure of the above application is incorporated herein by reference.

FIELD

This invention relates to methods of and apparatus for making thin, flexible composites that have a set of reservoirs interconnected by a set of capillaries.

BACKGROUND

This section provides background information related to the present disclosure which is not necessarily prior art.

Thin, flexible composites that have a plurality of reservoirs interconnected by capillaries can be used to perform chemical reactions delayed by time, temperature, and sometimes other variables.

One specific application of these composites is in condition-indicating labels. For example, such labels can provide an indication of condition of a product to which the label is attached, based upon the time or time and temperature since the product was manufactured, or more preferably, in the case of many consumers and other products, the time or time and temperature since the container was opened. Examples of such condition-indicating labels are disclosed in Time Indicator Device, U.S. Published Application 2010/0322037, published Dec. 23, 2010; and Open Life Indicator Label for Food Produce and Such like, U.S. Published Application 2008/0210152, published Sep. 4, 2008, the entire disclosures of which are incorporated herein by reference.

While the present methods and apparatus are particularly suited for the production of such time or time and temperature indicating labels, the methods and apparatus are not so limited, and can be employed in the production of any thin, flexible composite having reservoirs and capillaries, for example, for various testing or monitoring applications.

SUMMARY

This section provides a general summary of the disclosure, and is not a comprehensive disclosure of its full scope or all of its features.

Embodiments of the present invention provide methods of and apparatus for producing flexible sub-assemblies containing sets of at least one filled capillary, methods of and apparatus for producing flexible sub-assemblies containing a set of at least two filled reservoirs, and methods of and apparatus for producing flexible assemblies containing a set of at least one filled capillary and a set of at least two filled reservoirs.

In accordance with one preferred embodiment, a method is provided for forming a flexible capillary assembly having a set of at least one filled capillary. Generally this method comprises winding a flexible, deformable capillary base web partially around the surface of a rotating cylinder that has a plurality of sets of recessed features formed therein, each set corresponding to a set of capillaries. The recessed features underlying the capillary base web are connected to a source of reduced pressure to draw the capillary base web into the recessed features and form the set of capillaries therein. A fill material is applied to the surface of the capillary base web to fill the set of capillaries. A flexible capillary barrier web is laminated over the capillary base web to close the set of capillaries.

The fill material is preferably applied using a chambered doctor blade system with a central wet zone of the fill material and entrance and exit blades, to apply the fill material to the set of capillaries passing below the central wet zone of the chambered doctor blade system, as the cylinder rotates.

The capillary barrier web is preferably applied to the capillary base web while the capillary base web is on the rotating cylinder, using a lamination roller. The capillary barrier web preferably comprises a barrier layer and a peelable support layer. Vias can be formed in the barrier layer to provide access to the capillaries after the peelable support layer is removed.

In accordance with another preferred embodiment, a method is provided for forming a flexible capillary assembly having a set of at least one filled capillary. Generally this method comprises winding a first flexible, deformable capillary base web partially around the surface of a rotating cylinder that has a plurality of sets of recessed features formed therein, each set corresponding to a set of capillaries. The recessed features underlying the capillary base web are selectively connected to a source of reduced pressure to draw the capillary base web into the recessed features and form a set of capillaries therein. The recessed features exposed to the atmosphere are selectively disconnected from the source of reduced pressure. This can allow the use of lower capacity vacuum systems and reduce energy requirements.

The capillary base web is preferably applied to the surface of the rotating cylinder with a first lay-on roller removed from the rotating cylinder with a second lay-on roller. The recessed features in the surface of the cylinder between the first lay-on roller, where the capillary base web is applied and the second lay-on roller, where the capillary base web is removed are selectively connected to a source of reduced pressure. Conversely, the recessed features in the surface of the cylinder between the second lay-on roller where the capillary base web is removed and the first lay-on roller where the capillary base web is applied are selectively disconnected from the source of reduced pressure.

In accordance with another preferred embodiment of the invention, a tool is provided for forming a flexible capillary assembly having at least one set of at least one filled capillary. Generally, the tool can comprise a rotatably mounted cylinder having a plurality of circumferentially spaced zones. At least one set of recessed features is formed in the surface of at least some of the zones, each set corresponding to a set of capillaries, and each set having a port therein. Each of the zones of the cylinder can have a manifold communicating with the ports of each of the sets of recessed features in the zone. The manifold of each zone can be selectively connected to a source of reduced pressure to selectively connect the sets of recessed features in the zone to the source of reduced pressure.

The tool preferably comprises a core, and a sleeve removeably mounted over the core. The sets of recessed features are formed in the removable sleeve. This can reduce the cost of making tools for different configurations of sets of capillaries, and facilitate the conversion from manufacturing one configuration to another configuration. At least a portion of the manifold of each zone is in the core, and at least one seal is preferably provided between the core and the sleeve to provide sealed communication between the manifold and the port of each set of recessed features on the sleeve. This seal between the core and the sleeve is preferably pressurizable. In one particularly preferred embodiment, the seal comprises an o-ring surrounding each opening of the manifold in the core, and encompasses the port of at least one set of recessed features in the sleeve. These o-rings are preferably seated in a seat formed in the surface of the core. There is preferably a passage in the core for selectively pressurizing the seat to urge the o-ring into engagement with the sleeve installed over the core. There are preferably mating portions on the core and the sleeve to ensure that the sleeve is properly oriented with respect to the core, with the manifold openings in the core aligned with the proper ports in the sleeve.

In accordance with another preferred embodiment of the invention, a method is provided for forming a flexible reservoir assembly having a set of at least one filled reservoir. Generally, this method comprises cutting the perimeter of the set of at least one reservoir into a flexible reservoir web secured to a peelable support layer. The support layer is peeled and the waste cut interiors of the at least one reservoir of the set of reservoirs is removed from the reservoir web. The reservoir web is secured to a base layer, forming open top reservoirs. Each reservoir in the set is overfilled by depositing a plurality of layers of filling material into each reservoir. A reservoir barrier layer (which may be a capillary composite) is laminated over the overfilled reservoirs.

In addition to the reservoirs, the perimeter of at least one catchment is preferably also cut into the reservoir web, adjacent to at least one of the reservoirs of the set of reservoirs in the reservoir web. When the support layer is removed, it also removes the waste cut interior of the at least one catchment from the reservoir web. Then, when the reservoir barrier layer is laminated over the overfilled reservoirs, the excess filling material can be forced into the at least one catchment, wherein can be contained without interfering with the assembly or use of the reservoir assembly.

In accordance with another preferred embodiment of the invention, a method is provided for forming a flexible reservoir assembly having a set of at least two filled reservoirs. Generally, this method comprises cutting the perimeter of at least one reservoir pre-form, having at least two lobes separated by at least one juncture into a flexible reservoir web secured to a peelable support layer. The support layer is removed, removing the waste cut interior of the reservoir pre-form from the reservoir web. The reservoir web is secured to a base layer. A barrier material can be deposited into the at least one juncture to divide the reservoir pre-form into separate reservoirs corresponding to the lobes. Each of the reservoirs of the set can be overfilled by depositing a plurality of layers of filling material into each reservoir. A reservoir barrier layer (which may be a capillary composite) is laminated over the overfilled reservoirs.

The top surface of the barrier material is preferably calendared to the level of the surface of the reservoir web. An adhesive can be applied to the calendared surface of the deposited barrier material to facilitate attachment with the reservoir barrier layer.

In a particularly preferred embodiment, the reservoir pre-form has at least three lobes separated by at least two junctures. Barrier material is deposited at each of the at least two junctures to divide the reservoir pre-form into at least three reservoirs. The barrier material preferably comprises at least two different materials, and more preferably comprises first and second materials deposited in such way that the second material is surrounded on the top and sides by the first material.

In accordance with another preferred embodiment, a method is provided for manufacturing a flexible composite panel having a set of plurality of reservoirs connected by a set of at least one capillary. Generally, the method comprises forming a flexible capillary assembly having a set of at least one filled capillary. The capillary assembly can be formed by winding a first flexible, deformable capillary base web partially around the surface of a rotating cylinder that has a plurality of sets of recessed features formed therein, each set corresponding to a set of capillaries. The recessed features underlying the capillary base web can be selectively connected to a source of reduced pressure to draw the capillary base web into the recessed features and form the set of capillaries in the capillary base web. A fill material can be applied to the surface of the capillary base web to fill the set of capillaries. A capillary barrier web can be laminated over the capillary base web to close the capillaries.

The method of manufacturing the flexible composite panel further comprises forming a flexible reservoir assembly having a set of at least two filled reservoirs. The reservoir assembly can be formed by cutting the perimeter of the at least two reservoirs and associated catchments into a flexible reservoir web that is secured to a peelable support layer. The peelable support layer is removed, removing the waste cut interiors of the reservoirs and the catchments from the reservoir web. The reservoir web can be secured to a base layer. Each resulting reservoir can be overfilled by depositing a plurality of layers of filling material into the reservoir.

The capillary assembly can then be laminated over the reservoir assembly, with the capillary barrier web in contact with the reservoir web. This lamination process can drive excess filler from the reservoirs into the catchments, where they can be contained without interference to the manufacture or use of the final flexible composite panel.

The capillary fill material can be applied with a chambered doctor blade system, with a central wet zone of the fill material, and entrance and exit blades, to apply the fill material to the set of capillaries passing below the central wet zone of the chambered doctor blade system, as the cylinder rotates. The capillary barrier web is preferably laminated over the capillary base web while the capillary base web is on the rotating cylinder, using a lamination roller. The capillary barrier layer preferably comprises a barrier layer and a peelable capillary support layer. Vias can be formed in the barrier layer to provide access to the capillaries when the peelable capillary support layer is removed. The capillary support layer is removed before the capillary assembly is laminated to the reservoir assembly.

As the capillary assembly is laminated to the reservoir assembly, the contents of the capillaries and the reservoirs can communicate though the vias in the capillary assembly that are exposed when the peelable capillary support layer is removed. Thus the contents of the capillaries and the reservoirs can begin interacting or reacting. This interaction or reaction is preferably interrupted shortly after the capillary assembly is laminated to the reservoir by resiliently crimping the capillaries preferably closely adjacent the vias, so that only a limited amount of the materials in the capillary and the aligned reservoir can interact or react. The capillary is preferably resiliently crimped by a removable structure, so that the label can be activated by removing the removable structure, thereby un-crimping the capillary and allowing the interaction or reaction between the contents of the capillary and the reservoir to continue, triggering the time function of the label. The interaction between the contents of a capillary and the contents of a reservoir can include conducting (for example by diffusion) of an active substance from one reservoir to another reservoir via the capillary, or reactions between the contents of the capillary and the contents of the reservoirs or the barrier material that separates two reservoirs (in which case the contents of the capillary can help dissolve the barrier material, which subsequently allows the contents of two reservoirs to react).

At least some of the reservoirs in the reservoir assembly are preferably formed by sub-dividing at least one of the reservoirs into at least two separate reservoirs, by depositing a barrier material into the reservoir. At least one of the reservoirs preferably comprises at least two lobes separated by a juncture. This reservoir can be sub-divided into at least two reservoirs, by depositing a barrier material into the juncture. The top surface of the barrier material is preferably calendaring to the level of the surface of the reservoir web. An adhesive can be applied to the calendared surface of the deposited barrier material, to enhance bonding with the barrier layer of the capillary assembly.

In a particularly preferred embodiment, the reservoir to be divided has at least three lobes separated by at least two junctures. Barrier material is deposited at each of the at least two junctures to divide the reservoir into at least three reservoirs. This barrier material preferably comprises at least two different materials, and is preferably deposited as at least first and second materials, in such way that the second material is surrounded on the top and sides by the first material.

In another preferred embodiment of this invention, a method is provided for manufacturing a flexible composite panel having a set of a plurality of reservoirs connected by a set of a plurality of capillaries. Generally, the method comprises: forming a flexible capillary assembly having a set of at least two filled capillaries by winding a first flexible, deformable capillary base web partially around the surface of a rotating cylinder that has a plurality of sets of recessed features formed therein, each set corresponding to the set of capillaries. The recessed features underlying the capillary base web are connected to a source of reduced pressure to draw the capillary base web into the recessed features, and form the set of capillaries in the capillary base web. A fill material is applied to the surface of the capillary base web to fill the set of capillaries. A capillary barrier web is laminated over the capillary base web to close the capillaries.

A flexible reservoir assembly having a set of a plurality of filled reservoirs is also formed. The perimeter of at least a first reservoir, a second reservoir, and a third reservoir that comprises three lobes separated by two junctures, and associated catchments are cut into a flexible reservoir web that is secured to a peelable support layer. The peelable support layer is removed, and the waste cut interiors of the reservoirs and the catchments, are also removed from the reservoir web. The reservoir web is secured to a base layer. The third reservoir is sub-divided into at least three separate reservoirs by depositing a barrier material at each of the two junctures. Each of the reservoirs is overfilled, depositing a plurality of layers of filling material.

The capillary assembly is then laminated over the reservoir assembly, the lamination process driving excess filler from the reservoirs into their associated catchments. One end of one of the at least two capillaries is aligned with the first reservoir, and the other end of that capillary is aligned with one of the junctures of the third reservoir. One end of the other of the at least two capillaries aligned with the second reservoir, and the other end of that capillary is aligned with the other of the junctures of the third reservoir.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

This invention relates to methods of and apparatus for making thin, flexible composites that have a set of reservoirs interconnected by a set of capillaries.

Such thin, flexible composites can be used to perform chemical reactions delayed by time, temperature, and sometimes other variables, and find specific applications in condition-indicating labels. An example of such a condition indicating label is illustrated in FIGS. 1A-1D. While this detailed description describes this label, methods and apparatus for making this label in detail, the invention is not so limited, and applies to methods of and apparatus for producing flexible sub-assemblies containing sets of at least one filled capillary, methods of and apparatus for producing flexible sub-assemblies containing a set of at least two filled reservoirs, and methods of and apparatus for producing flexible assemblies containing a set of at least one filled capillary and a set of at least two filled reservoirs, for any purpose or application.

Figure 1A:
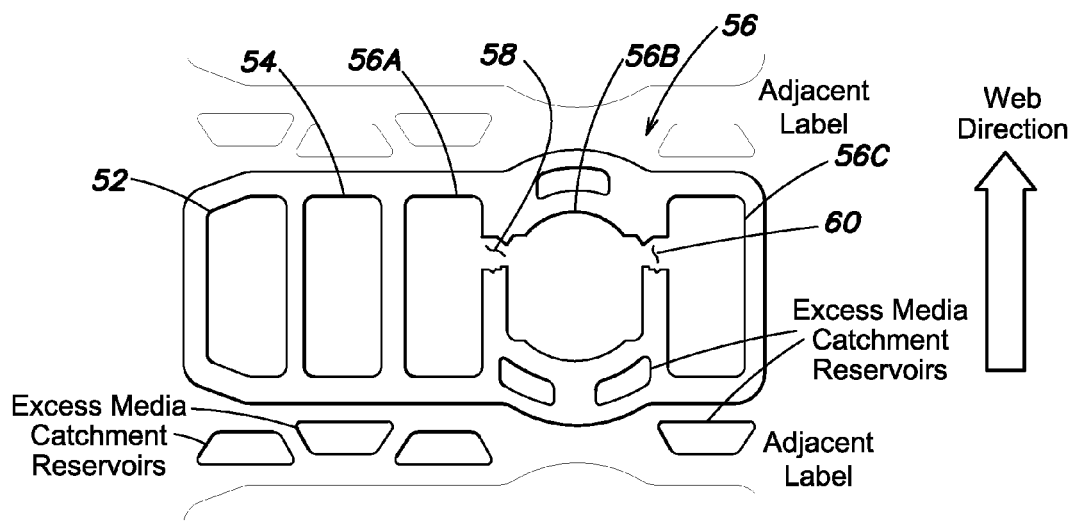
FIG. 1A shows the arrangement of reservoirs in an exemplary thin, flexible composite assembly of the type which the present methods and apparatus are adapted to make.
Figure 1B:
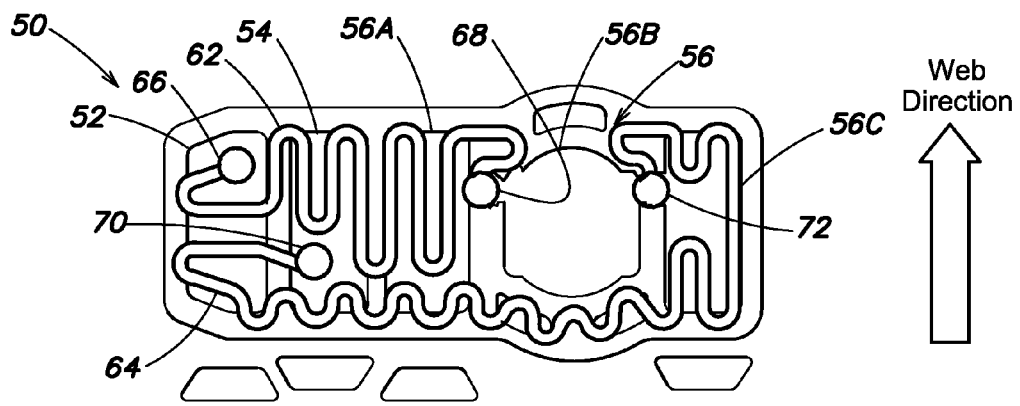
FIG. 1B shows the arrangement of the capillaries in relation to the reservoirs of the exemplary thin, flexible composite assembly, shown in FIG. 1A.
Figure 1C:
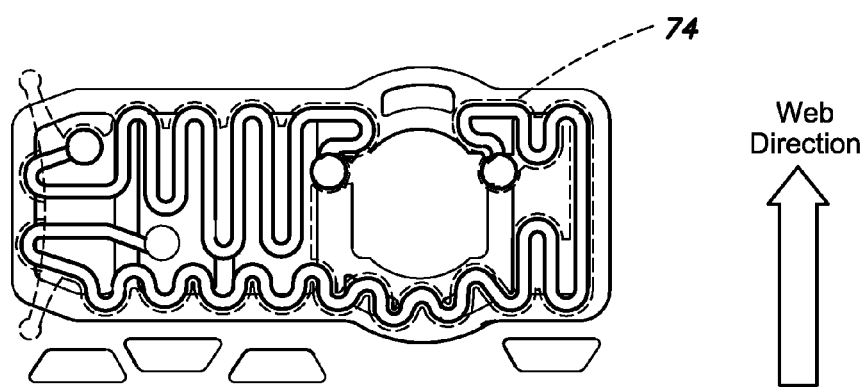
FIG. 1C shows an exemplary block layer for surrounding and protecting the capillaries of the exemplary thin, flexible composite assembly, shown in FIG. 1B.

As shown in FIG. 1A, the exemplary label 50 comprises a reservoir assembly comprising a set of reservoirs comprising a first reservoir 52, a second reservoir 54, and a third reservoir 56 divided into sub-reservoirs 56A, 56B and 56C by barriers 58 and 60. As shown in FIG. 1B, the exemplary label 50 further comprises a capillary assembly comprising a set of capillaries comprising a first capillary 62 and a second capillary 64. The first capillary 62 has a first end 66 in communication with first reservoir 52, and a second end 68 in communication with first barrier 58. The second capillary 64 has a first end 70 in communication with second reservoir 54 and a second end 72 in communication with the second barrier 60. As shown in FIG. 1C, a protective layer 74 can surround and protect the capillaries of the capillary assembly. In this preferred embodiment, the reservoir 56B is visible, and is colored to indicate condition of the material to which it is attached. For example, the reservoir 56B may be colored green, as an indicator of good condition.

In operation, once activated, the contents of first reservoir 52 are communicated to the first barrier 58, via first capillary 62. The contents of the first reservoir can operate to dissolve or erode the first barrier 58, and thus after a delay, will eventually allow the content of reservoir 56A and 56B to mix. This mixture changes the color of reservoir 56B to indicate a change of condition as the result of the passage of time. For example, the reservoir 56B may be colored yellow, as an indicator of diminished condition. This color change may be due exclusively to the mixture of the contents of reservoirs 56A and 56B, or it can be assisted by the mixture of the contents of the first reservoir 52 provided by the first capillary 62. Once activated, the contents of second reservoir 54 are communicated to the second barrier 60, via second capillary 64. The contents of the second reservoir can operate to dissolve or erode the second barrier 60, and thus after a delay, will eventually allow the content of reservoir 56C and 56B to mix. This mixture changes the color of reservoir 56B to indicate a change of condition, as the result of the passage of time. For example the reservoir 56B may be colored red, as an indicator of further diminished condition. This color change may be due exclusively to the mixture of the contents of reservoirs 56C and 56B, or it can be assisted by the mixture of the contents of the second reservoir 54 provided by the capillary 64.

By controlling the contents of the capillaries and their respective lengths, the timing of the mixture of reservoirs 56A and 56B, and subsequently reservoirs 56B and 56C, and the consequent color changes of reservoir 56B, can be controlled, to provide a time-based condition indicator.

Figure 1D:
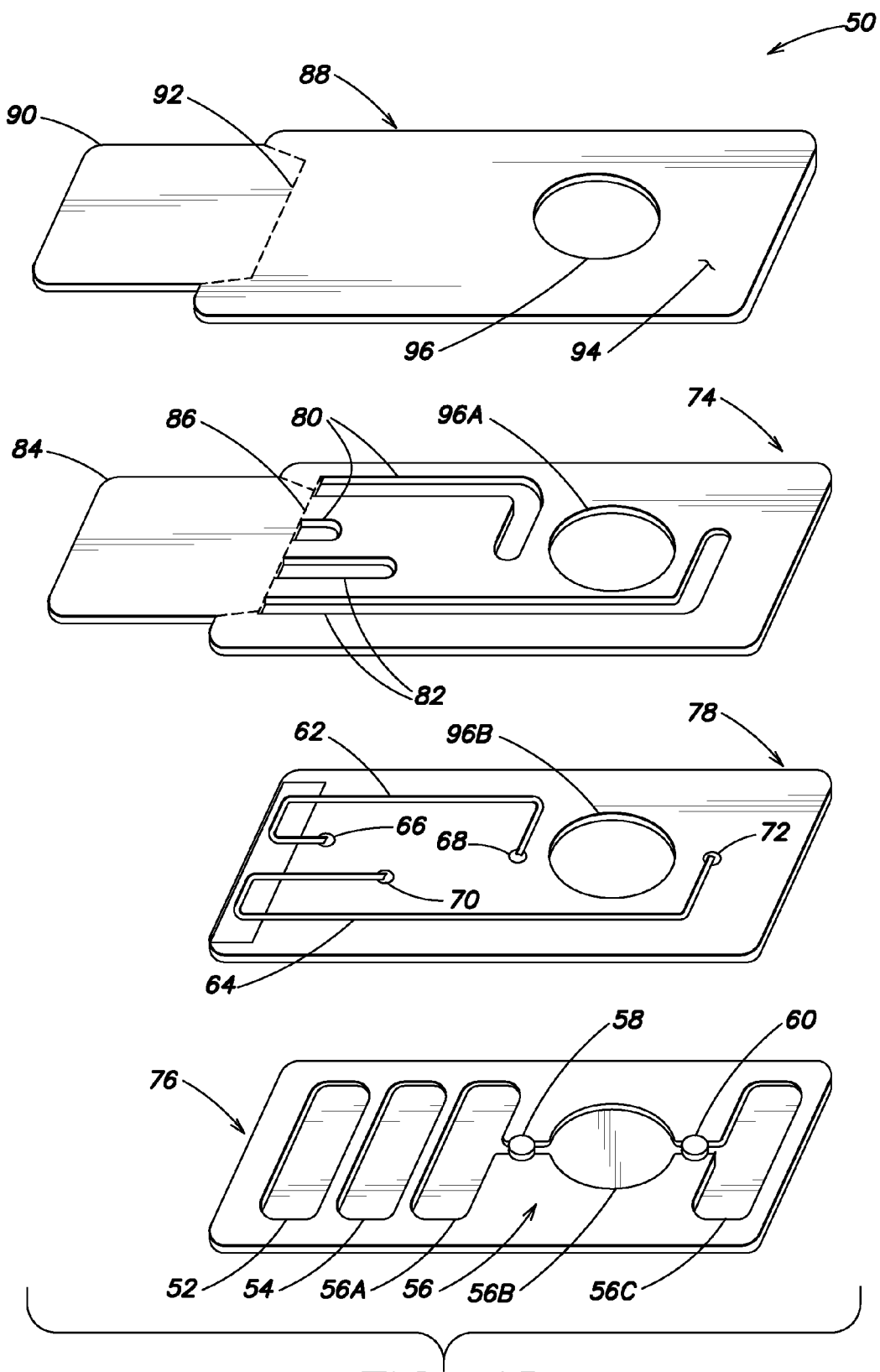
FIG. 1D is an exploded view showing the arrangement of a reservoir assembly and a capillary assembly in an exemplary thin, flexible composite assembly of the type which the present methods and apparatus are adapted to make.

As shown in FIG. 1D, the assembled label 50 comprises a reservoir assembly 76, in which is formed a set of reservoirs comprising a first reservoir 52, a second reservoir 54, and a third reservoir 56 divided into sub-reservoirs 56A, 56B, and 56C by barriers 58 and 60.

The assembled label also includes a capillary assembly 78 in which is formed a set of capillaries comprising a first capillary 62 and a second capillary 64. The first capillary 62 has a first end 66 that communicates with the first reservoir 52 and a second end 68 that communicates with first barrier 58. The second capillary 64 has a first end 70 that communicates with the second reservoir 54 and a second end 72 that communicates with the second barrier 60.

A protective layer 74 having cutouts 80 and 82 for accommodating the capillaries 62 and 64 overlies the capillary assembly 78 to surround and protect the capillaries of the capillary assembly. The protective layer also has a removable tab portion 84 defined by a line of perforations 86, that that overlies a portion of each of the capillaries 62 and 64 and which resiliently crimps the capillaries, to prevent them from conducting material from their respective reservoirs 52 and 54 to their respective plugs 56 and 58 until the tab 84 is removed.

A cover layer 88 overlies the protective layer 74. The cover layer 88 includes a tab 90 defined by a line of perforations 92, which substantially overlies and corresponds to the tab 84 of the protective layer 74. The cover layer has a top surface 94 onto which information, instructions, and/or decorative elements can be printed or embossed. The cover layer 88 also has a window or opening 96, that is aligned with a window or opening 96A in the protective layer 74, and which is aligned with a window or opening 96B in the capillary assembly, so that the reservoir 56B is visible from the top of the assembly 50.

The completed assembly is adapted to be secured on for example on a container, with the removable tab portion formed by tabs 84 and 90 secured to the lid for the container. When the lid is removed, the tabs 84 and 90 are removed from the assembly, which uncrimps the capillaries 62 and 64. Substances from the reservoir 52 are communicated via the capillary 52 to the barrier 58, and substances form the reservoir 54 are communicated via the capillary 64 to the barrier 60. The contents of the reservoirs, the length and content of the capillaries, and the content and structure of the barriers can all be controlled to achieve the desired functioning of the assembly. In the exemplary application, the content of the reservoir 52 is communicated via capillary 62 to dissolve plug 58, allowing the content of reservoir 56A to mix with the content of reservoir 56B, preferably changing the color of the reservoir 56B visible through the window in the top of the assembly (for example from green to yellow. Subsequently, the content of the reservoir 54 is communicated via capillary 64 to dissolve plug 60, allowing the content of reservoir 56C to mix with the content of reservoir 56B, preferably changing the color of the reservoir 56B visible through the window in the top of the assembly (for example from yellow to green). The assembly thus provides two different indications about the contents of the container. Of course a single indication or more than two indications could be provided by providing a different arrangement of reservoirs and capillaries.

Figure 2:
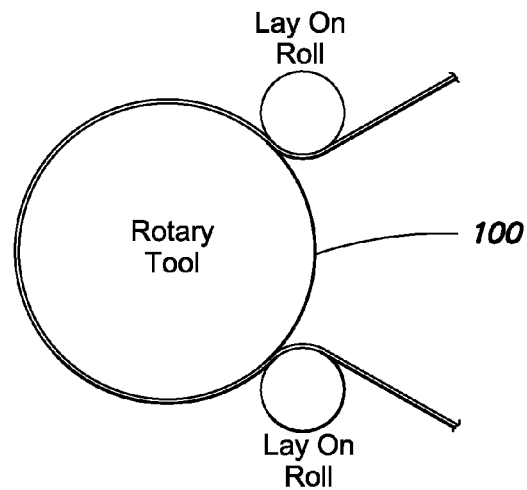
FIG. 2 is a schematic transverse cross-sectional view of the rotating cylindrical tool, showing the application and winding of the capillary base web, in accordance with the various embodiments of this invention.
Figure 3:
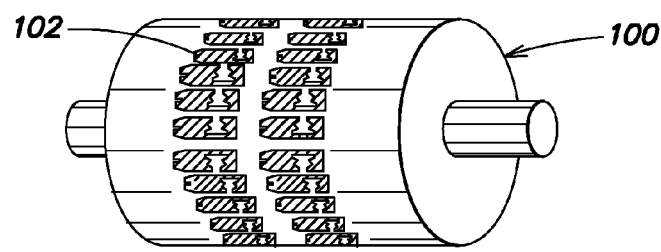
FIG. 3 is a schematic perspective view of an exemplary tool, showing a plurality of sets of recessed features for forming sets of capillaries in its surface.

In accordance with one embodiment, a method is provided for forming a flexible capillary assembly having a set of at least one filled capillary. Generally, this method comprises winding a flexible, deformable capillary base web partially around the surface of a rotating cylinder 100, as shown in FIG. 2. As shown in FIG. 3, the rotating cylinder 100 has a plurality of sets 102 of recessed features 104 formed therein. Each set 102 corresponds to a set of capillaries. The plurality of sets 102 of recessed features 104 allows a plurality of sets of capillaries to be formed simultaneously, and continuously.

Figure 4:
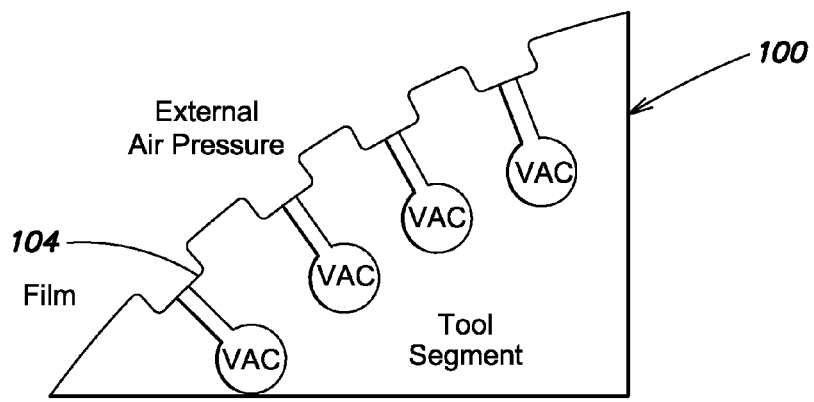
FIG. 4 is an enlarged partial cross-sectional view of the exemplary tool, showing the recessed features in the surface, and the ports and the manifold for connecting the recessed features to a source of reduced pressure, for forming the capillaries in the capillary base web.
Figure 9:
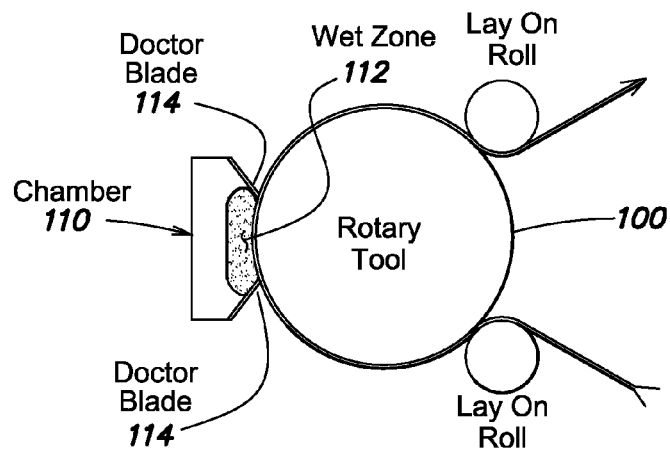
FIG. 9 is a schematic end elevation view of the tool, showing the application of fill material to the capillaries formed in the capillary base web.
Figure 10:
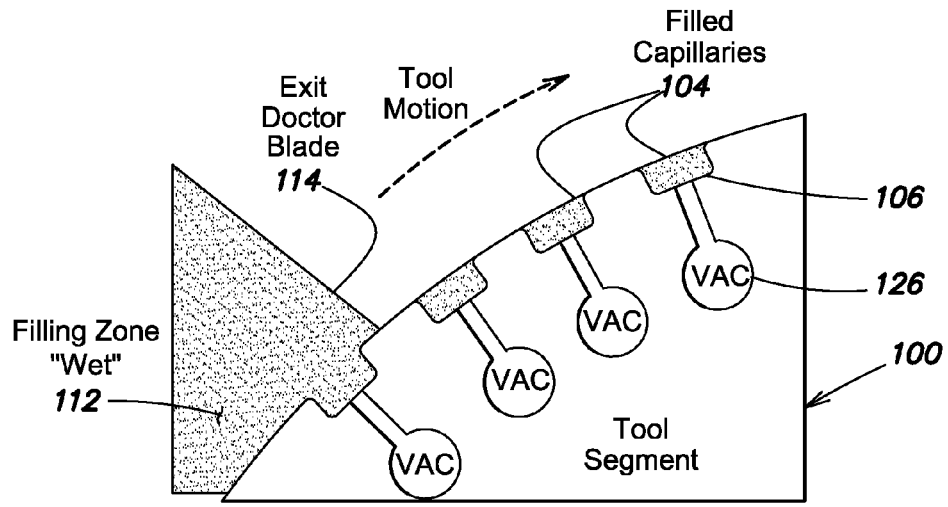
FIG. 10 is a schematic enlarged cross-sectional view of the tool shown in FIG. 9, showing the filling of the capillaries and the exit doctor blade.
Figure 13:
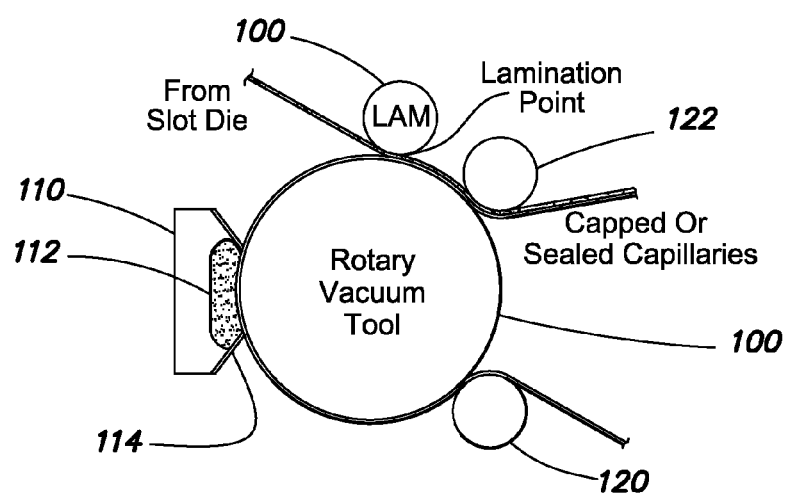
FIG. 13 is a schematic view of the process of laminating the capillary barrier web to the capillary base web.

As shown in FIG. 4, the sets 102 of recessed features 104 that underlie the capillary base web are connected to a source of reduced pressure to draw the capillary base web into the recessed features 104 and form the set of capillaries therein. As shown in FIGS. 9 and 10, fill material is applied to the surface of the capillary base web to fill the set of capillaries formed therein. As shown in FIG. 13, a flexible capillary barrier web is laminated over the capillary base web to close the set of capillaries.

As shown in FIGS. 9 and 10, the step of applying a fill material preferably uses a chambered doctor blade system 110, with a central wet zone 112 of the fill material and entrance and exit blades 114, to apply the fill material to the set of capillaries passing below the central wet zone of the chambered doctor blade system, as the cylinder 100 rotates. The fill material is typically a gel or other substance that mediates the flow along the length of the capillary. By controlling the properties of the fill material of the capillaries, the transit time can be adjusted, for example to adjust the timing of the indicator.

Figure 11:
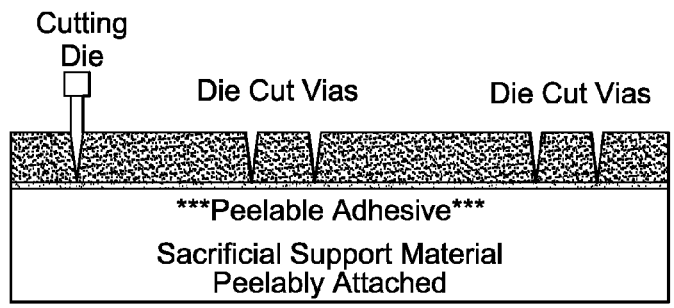
FIG. 11 is a schematic view of the capillary barrier web, showing the formation of vias in the barrier layer, and showing the removable capillary support layer.
Figure 12:
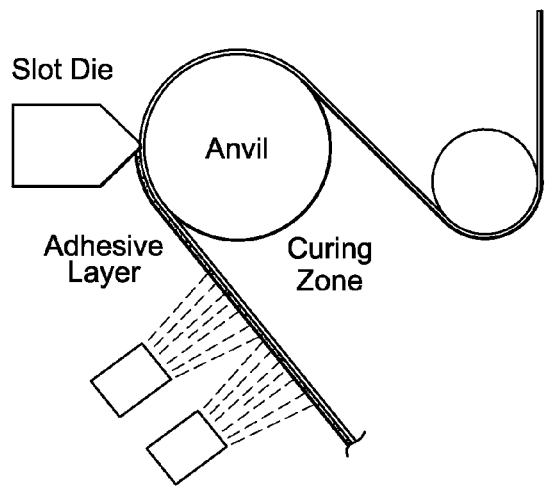
FIG. 12 is a schematic view of the process of applying adhesive to the capillary barrier web for subsequent lamination to the capillary base web.

As shown in FIG. 13, the capillary barrier web is preferably laminated over the capillary base web while the capillary base web is on the rotating cylinder, using a lamination roller 116. As shown in FIG. 11, the capillary barrier web preferably comprises a barrier layer and a peelable support layer. Vias or openings are preferably formed in appropriate locations in the barrier layer, to provide access to the capillaries after the peelable capillary support layer is removed. The peelable capillary support layer is not essential, and the capillary barrier web could omit the support layer, particularly when the capillary assembly will be used promptly after formation.

Where the capillary assembly will be stored for some time, it may be more convenient to provide a peelable capillary support layer.

Figure 5:
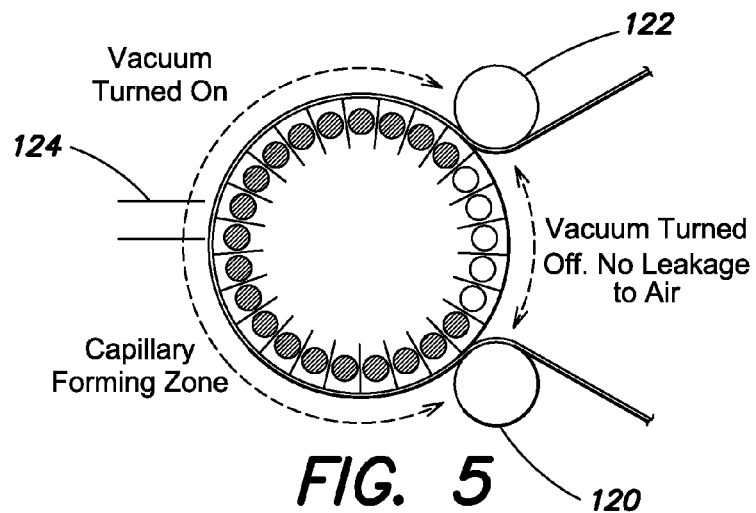
FIG. 5 is a schematic cross-sectional view of the exemplary tool, showing the selective connection of some of the sets of recessed features to a source of reduced pressure.

Because the capillary base web only partially wraps around the cylinder 100, a number of sets 102 of recessed features 104 are uncovered at any given time. These uncovered sets 102 of recessed features 104 affect the ability to maintain sufficiently low pressure below the capillary base web, at least without wasting energy and oversizing equipment. Thus, the method of making the capillary assembly preferably comprises winding the capillary base web partially around the surface of a rotating cylinder, and selectively connecting the recessed features underlying the capillary base web to a source of reduced pressure to draw the capillary base web into the recessed features and form a set of capillaries therein, and selectively disconnecting the recessed features exposed to the atmosphere from the source of reduced pressure. As shown in FIG. 5, the capillary base web is preferably applied to the surface of the rotating cylinder 100 with a first lay-on roller 120, and removed from the rotating cylinder, and wherein the capillary base web is removed from the rotating cylinder with a second lay-on roller 122. The recessed features in the surface of the cylinder between the first lay-on roller 120 where the capillary base web is applied to the cylinder 100 and the second lay-on roller 122, and wherein, the capillary base web is removed from the cylinder 100 are selectively connected to a source of reduced pressure. Conversely, the recessed features in the surface of the cylinder between the second lay-on roller where the capillary base web is removed and the first lay-on roller and where the capillary base web is applied are selectively disconnected from the source of reduced pressure.

A preferred embodiment of a tool for forming a flexible capillary assembly having at least one set of at least one filled capillary comprises a rotatably mounted cylinder 100, which as shown in FIG. 5, is divided into a plurality of circumferentially spaced zones 124. At least one set 102 of recessed features 104 is formed in the surface of at least some of the zones; each set 102 corresponding to a set of capillaries. Each set 102 preferably has a port 106 therein. Each of the zones 124 has a manifold 126 that communicates with the ports 106 of each of the sets 102 of recessed features 104 in the zone. Each of these manifolds 126 is selectively connectable to a source of reduced pressure to selectively connect the sets 102 of recessed features 104 in each zone 124 to the source of reduced pressure.

Figure 6:
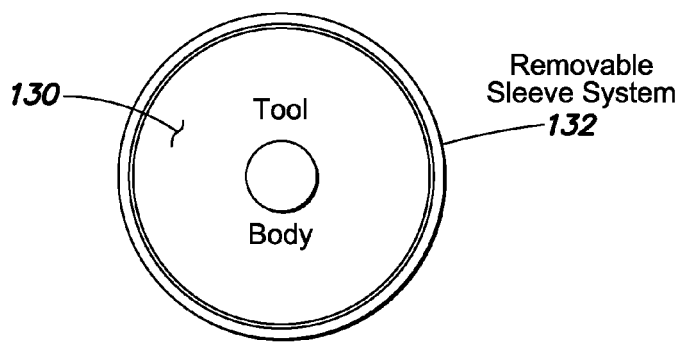
FIG. 6 is an end elevation view of a preferred embodiment of the tool, showing the core and a generally cylindrical sleeve.

As shown in FIG. 6, the cylinder 100 preferably comprises a core 130 and a sleeve 132, removeably mounted over the core. The sets 102 of recessed features 104 are formed in the sleeve 132. This makes it easier and less expensive to manufacture different capillary patterns, because rather than fabricating an entire cylinder 100 to make a new capillary pattern, only a new sleeve 132 needs to be fabricated. This construction also speeds conversion from the manufacture of one pattern, to the manufacture of another pattern, as the sleeve 132 is all that needs to be changed.

Figure 7:
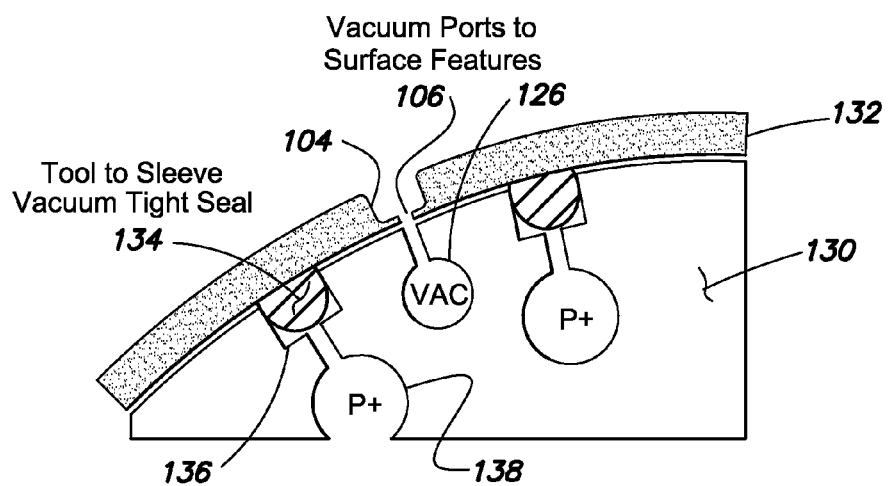
FIG. 7 is a an enlarged partial cross-sectional view of the exemplary tool, showing the recessed feature in the surface, and a ports and a manifold for connecting the recessed features to a source of reduced pressure, for forming the capillaries in the capillary base web, and a pressurized seal for sealing connecting a manifold opening on the core to a port on the sleeve.
Figure 8:
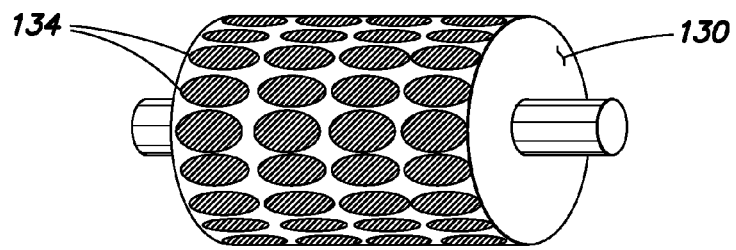
FIG. 8 is a perspective view of an alternate construction of the core of the exemplary tool, showing a plurality of o-rings thereon for sealing connection with a sleeve (not shown) installed over the core.

At least a portion of the manifold 126 of each zone 124 is disposed in the core 130. At least one seal is preferably provided between the core 130 and the sleeve 132 to provide sealed communication between each manifold 126 in the core 130 and the port 106 of each set 102 of the recessed features 104 in the zone 124. These seals between the core 130 and the sleeve 132 are preferably pressurizable, which provides a secure seal between the core and the sleeve, but which can be depressurized to facilitate the installation and removal of the sleeve from the core. These seals can comprise an o-ring 134, surrounding each opening of the manifold 126 in the core 130, which encompasses the port 106 of at least one set 102 of recessed features 104 in the corresponding zone 124 of the sleeve 132. Each o-ring 134 is preferably seated in a seat 136 in the surface of the core 130. As shown in FIG. 7, there is preferably a passage 138 in the core, communicating with the each seat 136, so that all of the seals can be simultaneously pressurized for using the cylinder 100, and depressurized to permit replacement of the sleeve 132. FIG. 8 illustrates one possible arrangement of o-rings 134 on a core 130, showing four o-rings 134 extending across each of 24 circumferentially spaced zones. Each core 130 and sleeve 132 can be provided with mating portions (not shown) on the core 130 and the sleeve 132 to ensure that the sleeve is properly oriented with respect to the core. This helps ensure that the openings of the manifold 126 are aligned with the ports 106 of the sets 102 of the recessed features 104 in the corresponding zone 124.

Figure 14:
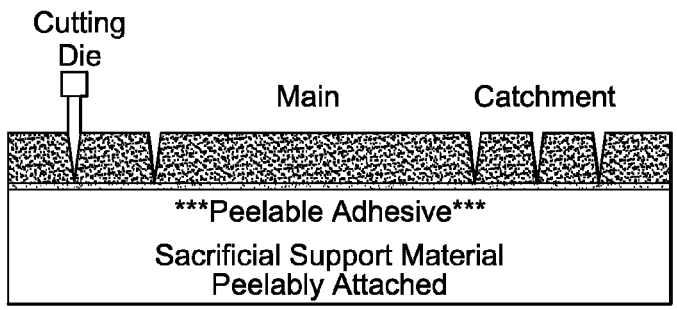
FIG. 14 is a schematic view showing the cutting of the perimeters of the reservoirs and catchments in the reservoir web.
Figure 15:
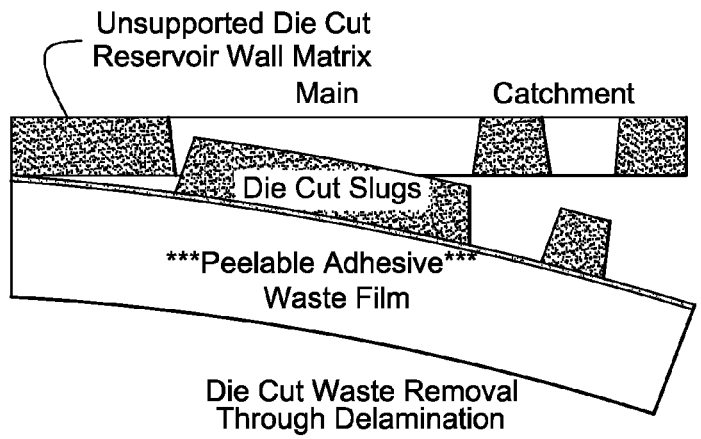
FIG. 15 is a schematic view showing the removal of the peelable support layer and waste cuts from the reservoirs and catchments.
Figure 16:
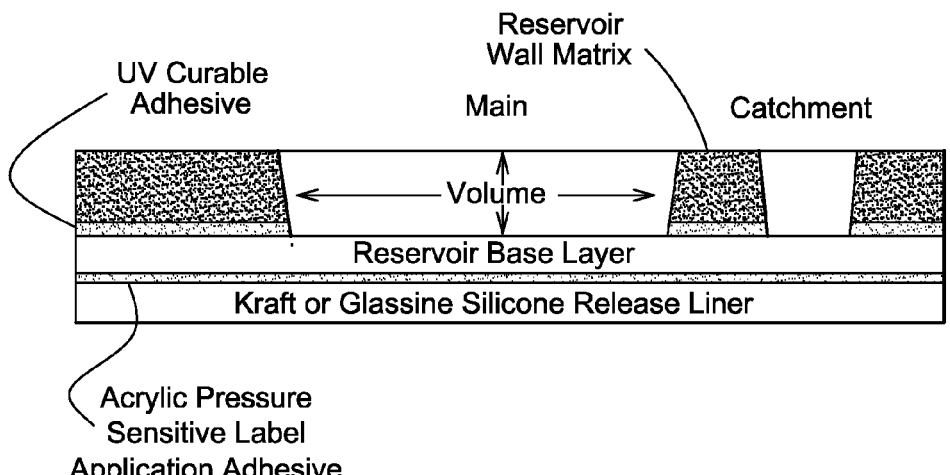
FIG. 16 is a schematic view showing the lamination of the reservoir web to a base layer comprising a bottom layer, a pressure sensitive adhesive, and a kraft paper or glassine silicone release liner.

Another preferred embodiment of this invention provides a method of forming a flexible reservoir assembly that has a set of at least one filled reservoir. Generally as shown in FIG. 14, the method of the preferred embodiment comprises cutting the perimeter of the set of at least one reservoir into a flexible reservoir web secured to a peelable support layer. This can be conveniently done in a continuous manner through rotary die cutting. As shown in FIG. 15, after the perimeter has been cut through the reservoir web, the support layer and the waste cut interiors of the reservoirs of the set of reservoirs are peeled from the reservoir web.

Figure 20:
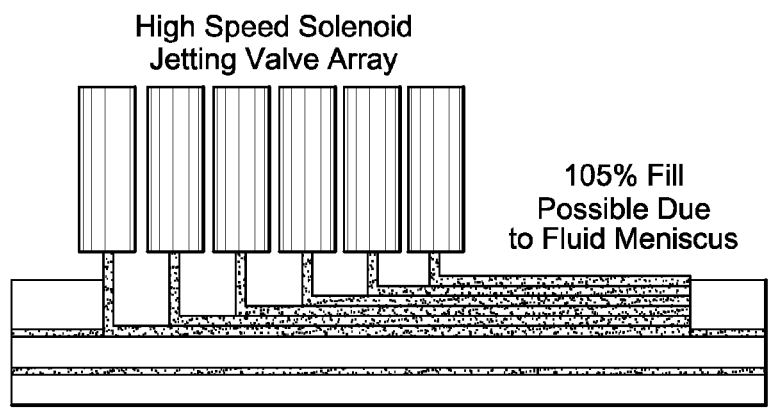
FIG. 20 is a schematic view from the side of the multilayer filling of a reservoir by a ganged array of solenoid operated jet valves, laying parallel lines of filling material on top of the other.
Figure 21:
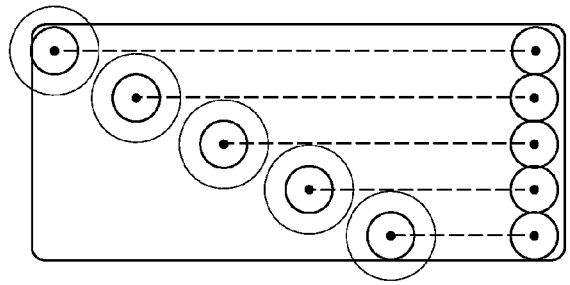
FIG. 21 is a schematic view from above the multilayer filling of a reservoir by a ganged array of solenoid operated jet valves, laying parallel lines of filling side-by-side.

The reservoir web is then secured to a base layer, for example with a UV curable adhesive to form open top reservoirs. This base layer can include an acrylic pressure sensitive adhesive, and a kraft of glassine silicone release layer, so that the reservoir assembly can be used to make an adhesive label. Each of the open top reservoirs is preferably overfilled in order to help reduce gaps and air bubbles in the completed reservoir. This overfilling is preferably accomplished by depositing a plurality of layers of the appropriate filling material into each reservoir. As shown in FIGS. 20 and 21, this is conveniently done with a ganged array of high-speed solenoid jetting valves. As shown in FIG. 20, this array is capable of successively depositing one layer on top of the preceding layer in a single pass. As shown in FIG. 21, each layer is made by depositing a plurality of parallel lines of filling. The reservoir assembly is completed by laminating a reservoir barrier layer over the overfilled reservoirs. This reservoir barrier layer preferably is the capillary assembly, so that the capillaries of the capillary assembly provide connections between the reservoirs in the reservoir assembly to form a complete, functional thin, flexible composite.

Figure 22:
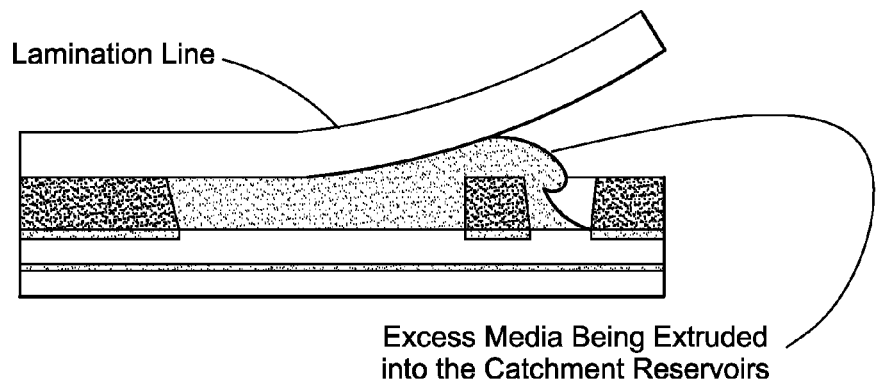
FIG. 22 is a schematic view of the laminating of the capillary assembly onto the reservoir assembly.
Figure 23:
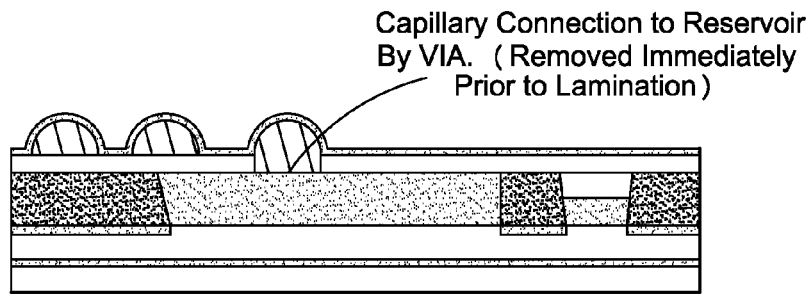
FIG. 23 is a schematic view of the assembled composite Corresponding reference numerals indicate corresponding parts throughout the several views of the drawings.

The step of cutting the perimeters of the reservoirs in the reservoir web, preferably also includes the step of cutting the perimeter of at least one catchment adjacent to at least one of the reservoirs of the set of reservoirs in the reservoir web. The step of removing the support layer also removes the waste cut interior of the at least one catchment from the reservoir web. Then, as the reservoir barrier layer is laminated over the overfilled reservoirs, the excess material has a place to go, the lamination process fording this excess material into the at least one catchment, as shown in FIG. 22. The excess material is held harmlessly in the catchments, and does not affect the operation of the completed assembly. In fact, the filled catchments can be trimmed from the completed assembly, for example by die cutting, but this is not necessary, since the contents of the catchments are held isolated from the functional parts of the assembly.

In another preferred embodiment of this invention, a method is provided for forming a flexible reservoir assembly having a set of at least two filled reservoirs. In general, this method comprises cutting the perimeter of at least one reservoir pre-form having at least two lobes separated by at least one juncture into a flexible reservoir web secured to a peelable support layer. The support layer is removed to remove the waste cut interior of the reservoir pre-form from the reservoir web. The reservoir web is secured to a base layer. A barrier material is deposited at the at least one juncture to divide the reservoir pre-form into separate reservoirs corresponding to the lobes. Each reservoir is then overfilled by depositing a plurality of layers of the appropriate filling material into the reservoir. A reservoir barrier layer is laminated over the overfilled reservoirs.

Figure 18:
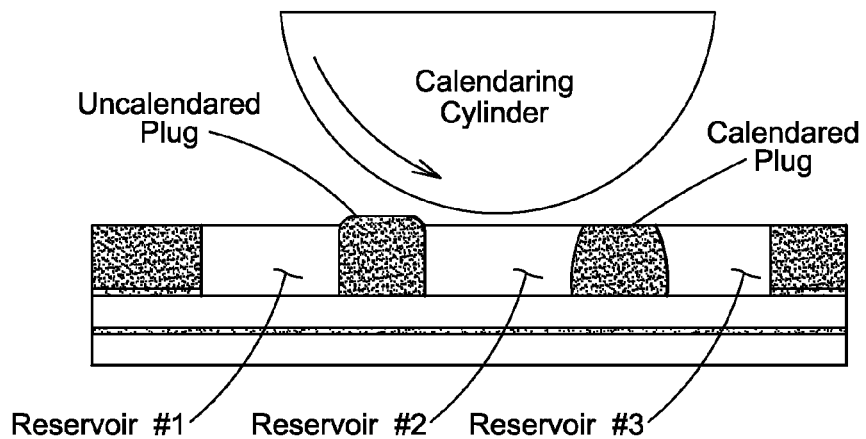
FIG. 18 is a schematic view of the optional calendaring process for leveling the tops of the barrier material.
Figure 19:
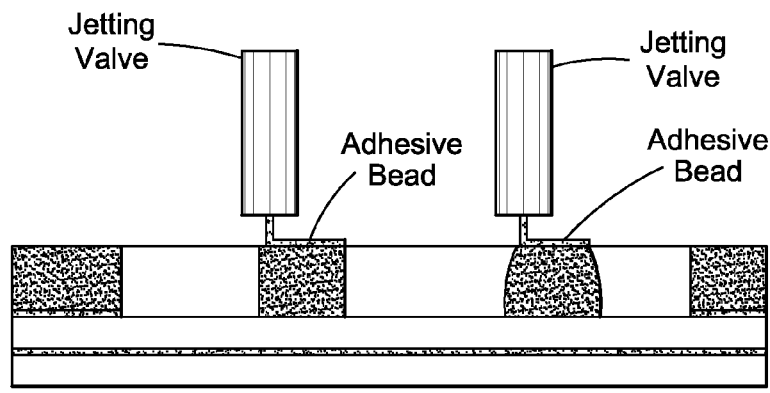
FIG. 19 is a schematic view of the optional application of adhesive to the top of the barrier material.

An excess of barrier material is preferably deposited at the junctures. Then, as shown in FIG. 18, the top surface of the deposited barrier material is calendared to the level of the surface of the reservoir web. To facilitate the sealing of the reservoirs, as shown in FIG. 19, an adhesive may be applied to the calendared surface of the deposited barrier material. This helps seal with the reservoir barrier layer, and prevents premature mixing of the contents of the reservoirs formed by the barrier material.

Figure 17A:
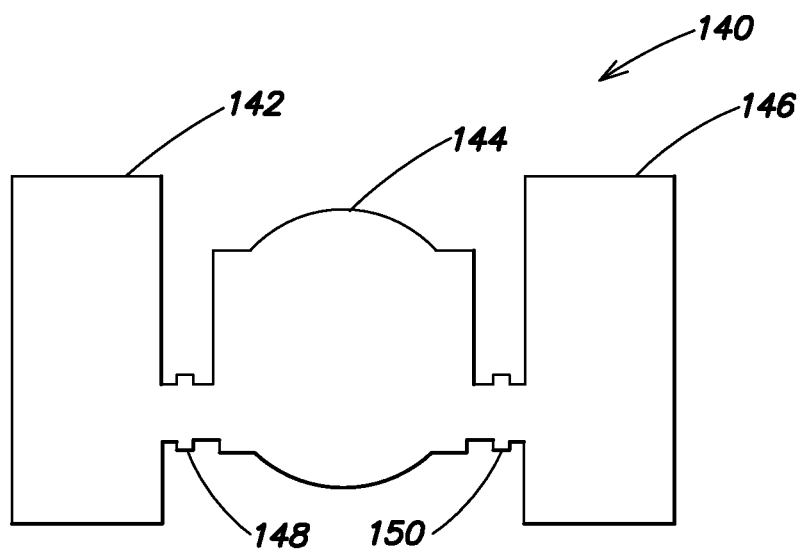
FIG. 17A is a top plan view of a multi-lobed reservoir that can be sub-divided into separate reservoirs.
Figure 17B:
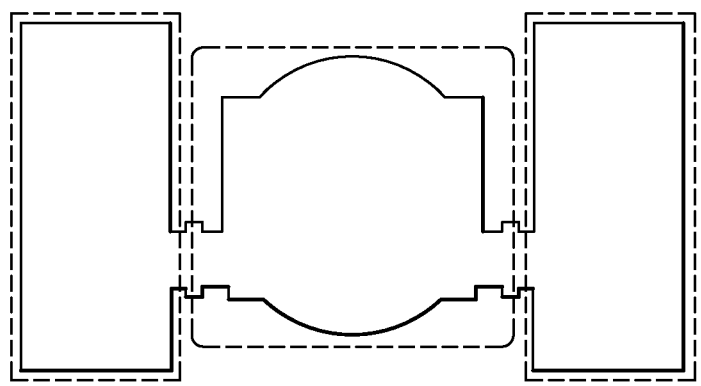
FIG. 17B is a top plan view of the multi-lobed reservoir with barrier material deposited into the junctures between lobes to form three separate reservoirs.

In a preferred embodiment shown in FIGS. 17A and 17B, the reservoir pre-form 140, preferably has at least three lobes 142, 144, and 146, separated by at least two junctures 148 and 150. The barrier material is deposited at each of the junctures 148 and 150, to divide the reservoir pre-form into at least three reservoirs.

The barrier material deposited preferably includes at least two different materials. For example, a first lipid-based material and a second lipid-based material containing an enzyme that can facilitate the dissolving or erosion of the barrier when activated. These materials can be deposited in such a way, that the second material is surrounded on the top and sides by the first material. Thus, as the first material slowly erodes to expose the second material the exposure of the second material can activate the enzyme to accelerate the dissolution or erosion of the barrier, and thus, facilitate the mixing of the contents of the formerly separated reservoirs.

Operation

In operation, embodiments of this invention provide a method of manufacturing a flexible composite panel having a set of plurality of reservoirs connected by a set of at least one capillary. In accordance with the principles of this invention, a flexible capillary assembly having a set of at least one filled capillary is formed. The capillary assembly is preferably formed by winding a first flexible, deformable capillary base web partially around the surface of a rotating cylinder that has a plurality of sets of recessed features formed therein. Each set of recessed features corresponds to a set of capillaries. The recessed features underlying the capillary base web are selectively connected to a source of reduced pressure to draw the capillary base web into the recessed features and form the set of capillaries in the capillary base web. Capillary fill material is applied to the surface of the capillary base web to fill the set of capillaries. This material is selected to provide the appropriate transit time of the contents of the various reservoirs to which they are connected. A capillary barrier web is laminated over the capillary base web to close the capillaries.

The method further comprises forming a flexible reservoir assembly having a set of at least two filled reservoirs. The flexible reservoir assembly is preferably formed by cutting the perimeter of the at least two reservoirs and associated catchments, into a flexible reservoir web that is secured to a peelable support layer. The peelable support layer is removed carrying with it the waste cut interiors of the reservoirs, and the catchments from the reservoir web. The reservoir web is secured to a base layer. Each of the resulting reservoirs can then be filled with the appropriate filling material. This is preferably done by depositing a plurality of layers of the filling material in each reservoir. The capillary assembly is then laminated over the reservoir assembly, with the capillary barrier web in contact with the reservoir web. This lamination process drives the excess filling material, from the reservoirs into the catchments.

As the capillary assembly is laminated to the reservoir assembly, the contents of the capillaries and the reservoirs can communicate though the vias in the capillary assembly that are exposed when the peelable capillary support layer is removed. Thus, the contents of the capillaries and the reservoirs can begin interacting and/or reacting. This reaction is preferably interrupted shortly after the capillary assembly is laminated to the reservoir by resiliently crimping the capillaries preferably closely adjacent the vias, so that only a limited amount of the material in the capillary can interact or react with the contents of the aligned reservoir. This capillary is preferably crimped by a removable structure, so that the label can be activated by removing the removable structure, thereby un-crimping the capillary and allowing the interaction or reaction between the contents of the capillary and the reservoir to continue, triggering the time function of the label. In some label schemes the capillary merely acts as a conduit for active substances in one or more of the reservoirs. In other label schemes the contents of the capillary can react with the contents of a reservoir, or barrier material separating two reservoirs.

The completed flexible composite panel can then be cut out for use. This process can remove some or all of the catchments, although this is not necessary, as the catchments can hold the excess filling material. A block layer having a cut out for accommodating and protecting the capillaries can be installed over the capillary assembly, as shown in FIG. 1C. This block layer can include removable portions that temporarily pinch the capillaries closed. Once removed, materials in the reservoirs can begin to migrate, via the capillaries.

The fill material is preferably applied to the capillaries, using a chambered doctor blade system to apply the fill material, to the set of capillaries passing below the central wet zone of the chambered doctor blade system, as the cylinder rotates. All the capillaries of each set are preferably filled with the same material, although different materials could be used. When the same materials are used, the differential timing results from the different lengths of the capillaries, which have circuitous paths to achieve the desired timing in a compact space. The selection of the material also provides some control over the timing of the reactions. In some instances it may be necessary to heat or chill the fill material to achieve an appropriate viscosity for the filling operation.

The capillary barrier web is preferably applied to the capillary base web, while the capillary base web is on the rotating cylinder, using a lamination roller. The capillary barrier layer preferably comprises a barrier layer and a peelable support layer. Vias are formed in the barrier layer, in positions to align with selected reservoirs when laminated thereon. The peelable support layer can temporarily block the vias, and is removed before the capillary assembly is laminated to the reservoir assembly. However, where the capillary barrier web will be used contemporaneously or nearly contemporaneously with its manufacture, the support layer may not be essential.

At least one of the reservoirs can be divided into at least two separate reservoirs by depositing a barrier material. The reservoir comprises at least two lobes separated by a juncture, and more preferably, at least three lobes separated by two junctures. An excess of the barrier material is preferably deposited and the top surface of the deposited barrier material is calendared to the level of the surface of the reservoir web. An adhesive can be applied to the calendared surface of the deposited barrier material to facilitate the separation of the reservoirs. The barriers can be formed of a single material, but the barrier is preferably formed of at least two different materials. At least first and second materials are deposited in such way, that the second material is surrounded on the top and sides by the first material.

In making a label indicator like that shown in FIGS. 1A-1C, a flexible capillary assembly having a set of at least two filled capillaries is preferably formed by winding a first flexible, deformable capillary base web partially around the surface of a rotating cylinder that has a plurality of sets of recessed features formed therein. Each set of recessed features corresponds to a set of capillaries. The recessed features underlying the capillary base web are selectively connected to a source of reduced pressure to draw the capillary web into the recessed features and form the set of capillaries in the capillary base web. Fill material is applied to the surface of the capillary base web to fill the set of capillaries. A capillary barrier web, having vias formed therein, is laminated over the capillary base web to close the capillaries.

A flexible reservoir assembly having a set of a plurality of filled reservoirs is formed by cutting the perimeter of at least a first reservoir, a second reservoir, and a third reservoir that comprises three lobes separated by two junctures, and associated catchments into a flexible reservoir web that is secured to a peelable support layer. The peelable support layer is removed, removing the waste cut interiors of the reservoirs and the catchments from the reservoir web. The reservoir web is secured to a base layer; sub-dividing the third reservoir into at least three separate reservoirs by depositing a barrier material at each of the two junctures. Each of the reservoirs is filled by depositing a plurality of layers of filling material.

The capillary assembly is laminated over the reservoir assembly. This lamination process drives excess filler from the overfilled reservoirs into their associated catchments. One end of one of the at least two capillaries is aligned with the first reservoir, and the other end of that capillary aligned with one of the junctures of the third reservoir. One end of the other of the at least two capillaries is aligned with the second reservoir, and the other end is aligned with the other of the junctures of the third reservoir.

The capillary assemblies and the reservoir assemblies can be separately manufactured and stored, but preferably, the capillary assemblies and reservoir assemblies are manufactured contemporaneously, in a substantially continuous process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a flexible reservoir assembly having a set of at least one filled reservoir, the method comprising:

cutting the perimeter of the set of at least one reservoir into a flexible reservoir web secured to a peelable support layer;

cutting the perimeter of at least one catchment adjacent to at least one of the reservoirs in the reservoir web;

removing the support layer and the waste cut interiors of the reservoirs and cachement from the reservoir web;

securing the reservoir web to a base layer;

overfilling each reservoir by depositing a plurality of layers of filling material into each reservoir; and laminating a reservoir barrier layer over the overfilled reservoirs to force excess filling material into the at least one catchment.

2. A method of forming a flexible reservoir assembly having a set of at least two filled reservoirs, the method comprising:

cutting the perimeter of at least one reservoir pre-form having at least two lobes separated by at least one juncture through which lobes can communicate into a flexible reservoir web secured to a peelable support layer;

removing the support layer and the waste cut interior of the reservoir pre-form from the reservoir web;

securing the reservoir web to a base layer;

depositing a barrier material at the at least one juncture to divide the reservoir pre-form into separate reservoirs corresponding to the lobes;

overfilling each reservoir by depositing a plurality of layers of filling material into each reservoir; and laminating a reservoir barrier layer over the overfilled reservoirs.

3. The method according to claim 2, further comprising the step of calendaring the top surface of the deposited barriers material to the level of the surface of the reservoir web.

4. The method according to claim 3, further comprising the step of applying adhesive to the calendared surface of the deposited barrier material.

5. The method according to claim 3, wherein the reservoir pre-form has at least three lobes separated by at least two junctures, and wherein the step of depositing a barrier material comprises depositing barrier material at each of the at least two junctures to divide the reservoir pre-form into at least three reservoirs.

6. The method according to claim 5, wherein the step of depositing a barrier material comprises depositing at least two different materials.

7. The method according to claim 6, wherein the step of depositing two different materials comprises depositing at least first and second materials in such way that the second material is surrounded on the top and sides by the first material.

8. A method of manufacturing a flexible composite panel having a set of plurality of reservoirs connected by a set of at least one capillary, the method comprising:

forming a flexible capillary assembly having a set of at least one filled capillary by winding a first flexible, deformable capillary base web partially around the surface of a rotating cylinder that has a plurality of sets of recessed features formed therein, each set corresponding to a set of capillaries; connecting the recessed features underlying the capillary base web to a source of reduced pressure to draw the capillary base web into the recessed features and form the set of capillaries in the capillary base web; applying a fill material to the surface of the capillary base web to fill the set of capillaries; laminating a capillary barrier web over the capillary base web to close the capillaries;

forming a flexible reservoir assembly having a set of at least two filled reservoirs by cutting the perimeter of the at least two reservoirs and associated catchments into a flexible reservoir web that is secured to a peelable support layer; removing the peelable support layer and the waste cut interiors of the reservoirs and the catchments from the reservoir web; securing the reservoir web to a base layer; overfilling each reservoir by depositing a plurality of layers of filling material; and laminating the capillary assembly over the reservoir assembly, with the capillary barrier web in contact with the reservoir web, the lamination process driving excess filler from the reservoirs into the catchments.

9. The method according to claim 8, wherein the step of applying a fill material to the set of capillaries uses a chambered doctor blade system, with a central wet zone of the fill material and entrance and exit blades, to apply the fill material to the set of capillaries passing below the central wet zone of the chambered doctor blade system as the cylinder rotates.

10. The method according to claim 8, wherein the step of laminating the capillary barrier web over the capillary base web comprises applying the capillary barrier web to the capillary base web while the capillary base web is on the rotating cylinder, with a lamination roller.

11. The method according to claim 8, wherein the capillary barrier layer comprises a barrier layer and a peelable support layer, and further comprising the step of forming vias in the barrier layer, which provide access to the capillaries when the peelable capillary support layer is removed, and wherein the step of laminating the capillary assembly to the reservoir assembly comprises removing the peelable capillary support layer before laminating the capillary assembly to the reservoir assembly.

12. The method according to claim 8, wherein the capillary barrier web comprises a barrier layer and a peelable capillary support layer, and further comprising the step of forming vias in the barrier layer, which provide access to the capillaries.

13. The method according to claim 8, further comprising the steps of sub-dividing at least one of the reservoirs into at least two separate reservoirs by depositing a barrier material.

14. The method according to claim 4, wherein at least one of the reservoirs comprises at least two lobes separated by a juncture, and further comprising the step of sub-dividing the at least one reservoir into at least two reservoirs by depositing a barrier material into the junction.

15. The method according to claim 14, further comprising the step of calendaring the top surface of the deposited barrier material to the level of the surface of the reservoir web.

16. The method according to claim 15, further comprising the step of applying adhesive to the calendared surface of the deposited barrier material.

17. The method according to claim 14, wherein the reservoir to be divided has at least three lobes separated by at least two junctures, and wherein the step of depositing a barrier material comprises depositing barrier material at each of the at least two junctures to divide the reservoir into at least three reservoirs.

18. The method according to claim 14, wherein the step of depositing a barrier material comprises depositing at least two different materials.

19. The method according to claim 18, wherein the step of depositing two different materials comprises depositing at least first and second materials in such a way that the second material is surrounded on the top and sides by the first material.

20. A method of manufacturing a flexible composite panel having a set of a plurality of reservoirs connected by a set of a plurality of capillaries, the method comprising:

forming a flexible capillary assembly having a set of at least two filled capillaries by winding a first flexible, deformable capillary base web partially around the surface of a rotating cylinder that has a plurality of sets of recessed features formed therein, each set corresponding to the set of capillaries; connecting the recessed features underlying the capillary base web to a source of reduced pressure to draw the capillary web into the recessed features and form the set of capillaries in the capillary base web; applying a fill material to the surface of the capillary base web to fill the set of capillaries; laminating a capillary barrier web over the capillary base web to close the capillaries;

forming a flexible reservoir assembly having a set of a plurality of filled reservoirs by cutting the perimeter of at least a first reservoir, a second reservoir, and a third reservoir that comprises three lobes separated by two junctures, and associated catchments into a flexible reservoir web that is secured to a peelable support layer; removing the peelable support layer and the waste cut interiors of the reservoirs and the catchments from the reservoir web; securing the reservoir web to a base layer; sub-dividing the third reservoir into at least three separate reservoirs by depositing a barrier material at each of the two junctures; overfilling each reservoir by depositing a plurality of layers of filling material; and laminating the capillary assembly over the reservoir assembly, the lamination process driving excess filler from the reservoirs into their associated catchments, with one end of one of the at least two capillaries aligned with the first reservoir and the other end aligned of that capillary aligned with one of the junctures of the third reservoir, and with one end of the other of the at least two capillaries aligned with the second reservoir and the other end aligned with the other of the junctures of the third reservoir.

* * * * *

UNITED STATES PATENT AND TRADEMARK OFFICE
CERTIFICATE OF CORRECTION

| | | |
|---|---|---|
| PATENT NO. | : 8,936,693 B2 | Page 1 of 1 |
| APPLICATION NO. | : 13/479494 | |
| DATED | : January 20, 2015 | |
| INVENTOR(S) | : Kevin Stone Manes and John Robinson | |

It is certified that error appears in the above-identified patent and that said Letters Patent is hereby corrected as shown below:

On the title page item (73), the Assignee address incorrectly reads "Chesterfield, MS" and should read ---Chesterfield, MO---.

Signed and Sealed this
Twenty-eighth Day of April, 2015

Michelle K. Lee
*Director of the United States Patent and Trademark Office*